United States Patent
Brock et al.

(10) Patent No.: US 6,473,085 B1
(45) Date of Patent: Oct. 29, 2002

(54) SYSTEM FOR DYNAMICALLY ADJUSTING IMAGE QUALITY FOR INTERACTIVE GRAPHICS APPLICATIONS

(75) Inventors: Bishop Chapman Brock; Eli Chiprout; Elmootazebllah Nabil Elinozahy; Ramakrishnan Rajamony; Freeman Leigh Rawson, III; Ronald Lynn Rockhold, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/465,295

(22) Filed: Dec. 17, 1999

(51) Int. Cl.7 .............................................. G06F 15/16
(52) U.S. Cl. ........................ 345/502; 345/418; 709/105
(58) Field of Search ................................ 345/418, 502, 345/505, 501; 709/105, 100, 104

(56) References Cited

U.S. PATENT DOCUMENTS

| | | | | |
|---|---|---|---|---|
| 5,325,493 A | * | 6/1994 | Herrell et al. | 712/201 |
| 6,154,223 A | * | 11/2000 | Baldwin | 345/505 |
| 6,232,974 B1 | * | 5/2001 | Horvitz et al. | 345/502 |
| 6,377,265 B1 | * | 4/2002 | Bong | 345/505 |

* cited by examiner

Primary Examiner—Kee M. Tung
(74) Attorney, Agent, or Firm—Casimer K. Salys; Bracewell & Patterson, L.L.P.

(57) ABSTRACT

A method and system for optimizing image quality while operating an interactive graphics application within a data processing system. First, the image rendering speed for each of the rendering modes available within the interactive graphics application are assessed. Upon initial operation of the interactive graphics system, a default rendering mode is activated. During operation of the interactive graphics application, the processing load imposed on the data processing system is monitored and utilized as a user activity metric. The active rendering mode is updated in accordance with the user activity metric, such that the speed of the selected rendering mode varies inversely with the current processing load.

26 Claims, 4 Drawing Sheets

SYSTEM FOR DYNAMICALLY ADJUSTING IMAGE QUALITY FOR INTERACTIVE GRAPHICS APPLICATIONS

BACKGROUND OF THE INVENTION

1. Technical Field

The present invention relates to an improved method and system for rendering computer images, and in particular to a method and system for enhancing the real-time image quality of interactive graphics applications. More particularly, the present invention relates to improving the quality of rendered graphics images by balancing the rendering load imposed on an interactive graphics processor with anticipated user activity. Still more particularly, the present invention relates to maximizing the visual quality of rendered images by dynamically selecting from among rendering engines such that the amount of computation required to render using the selected mode is compatible with the current processing load.

2. Description of the Related Art

Interactive graphics applications require visual responses to user input in the form of computer rendered images. Computer rendering generally involves creating an image utilizing both modeling and rendering tools. Common modeling applications include CAD systems. The process of rendering a modeled image requires a numeric description of geometric and other visual attributes of a model within a computer program. In addition, information not generally provided by the modeling application such as lighting, and surface attributes such as color, reflective properties, and texture are also required.

The success or failure of a rendering process may be judged in terms of the visual effect presented to the user of the interactive application. In this context, the ultimate goal in rendering a computer model is not just the image quality. There are several other parameters that must be taken into account in order to evaluate image rendering. These include system-dependent factors such as the smoothness of animated motion and timely responses to user input, and also frame quality parameters such as the level of antialiasing.

In an interactive graphics system such as a videogame application, the major load imposed on the processor is that required for rendering images on a visual display device. During periods when user input increases, the processor may have insufficient processing resources for properly rendering the images at the pace dictated by the user. Such processor overload may cause omission of some "scenes", thus resulting in jerky animation. Another possible symptom of user input outpacing processing capacity is a generally sluggish image rendering response.

On the other hand, when the user input activity is minimal, the processor is underutilized, thus resulting in a less-than-optimum image quality presented to the user. Applications designed to operate on graphics systems must therefore compromise image quality to ensure a baseline adequate interactive graphics presentation. Conventional interactive graphics applications have relied on carefully selecting a design point for rendering images which balances predicted user activity levels against the processing load required for rendering images in a satisfactory manner.

This single-point balancing is unsatisfactory in light of several factors. First, the intensity of user input into an interactive graphics application will have a vast variation not only among individuals of varying aptitudes, but also for an individual as he or she becomes more proficient. In addition there is a wide variation in the processing capacity of data processing systems on which interactive graphics systems are installed and utilized.

From the foregoing, it can be appreciated that a need exists for a method and system in which the rendered image quality may be dynamically adjusted in accordance with real-time processing load.

SUMMARY OF THE INVENTION

It is therefore an object of the invention to provide an improved method and system for rendering computer images.

It is another object of the invention to provide a method and system for enhancing the real-time image quality of interactive graphics applications.

It is a further object of the invention to improve the quality of rendered graphics images by balancing the rendering load imposed on an interactive graphics processor with anticipated user activity.

It is yet another object of the present invention to maximize the visual quality of rendered images by dynamically selecting from among rendering engines such that the amount of computation required to render using the selected mode is compatible with the current processing load.

The above and other objects are achieved as is now described. A method and system are disclosed for enhancing image quality while operating an interactive graphics application within a data processing system. First, the image rendering speed for each of the rendering modes available within the interactive graphics application are assessed. Upon initial operation of the interactive graphics system, a default rendering mode is activated. During operation of the interactive graphics application, the processing load imposed on the data processing system is monitored and utilized as a user activity metric. The rendering mode utilized is changed in accordance with the user activity metric, such that the computation required to render using the selected mode is compatible with the current processing load.

DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
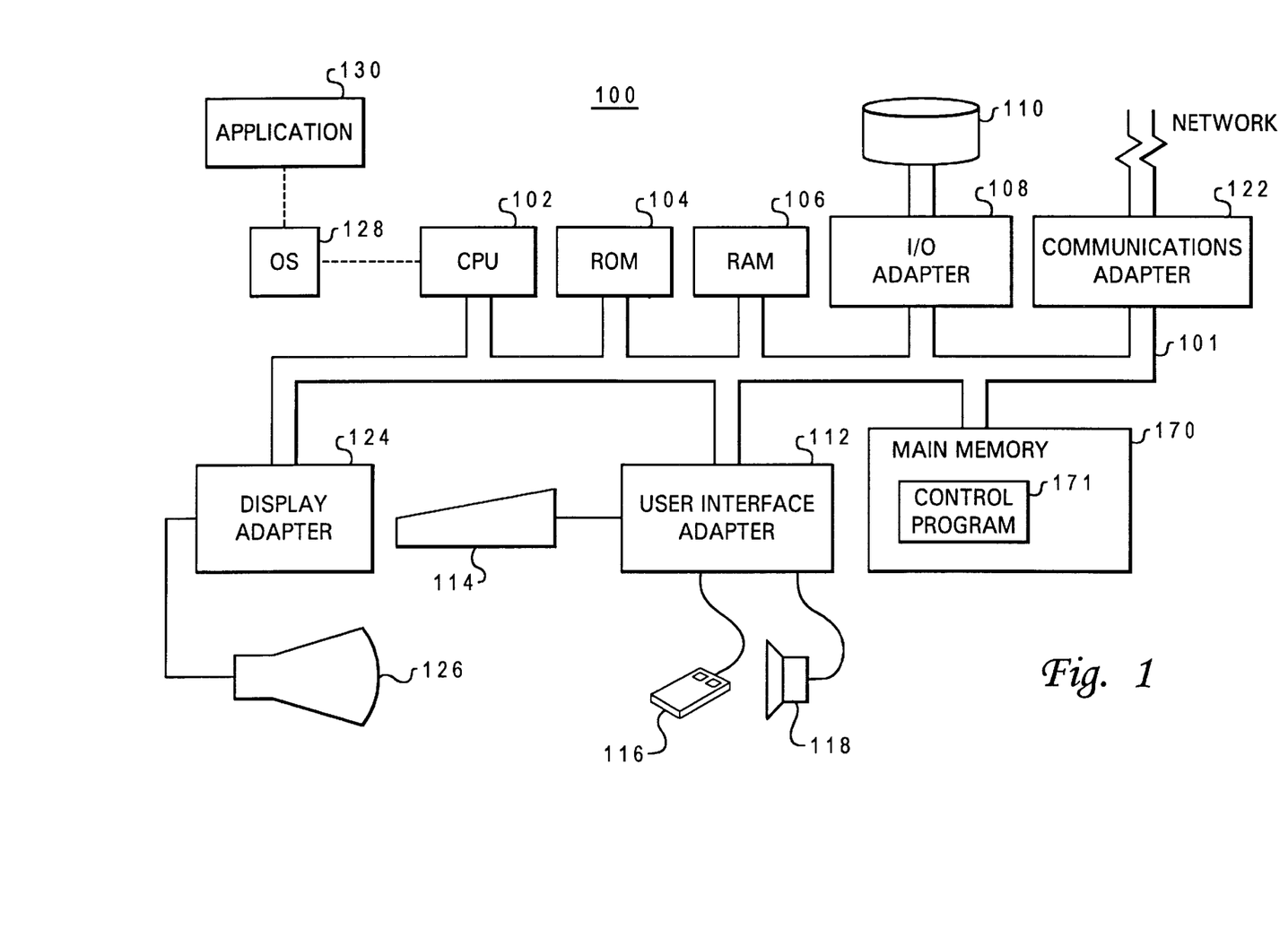
FIG. 1 depicts a data processing system with which the method and system of the present invention may be implemented.

Turning now to FIG. 1, there is illustrated a typical data processing system 100 in which a preferred embodiment of the present invention may be implemented. A central processing unit (CPU) 102, such as one of the PC microprocessors available from International Business Machines Corporation (IBM), is provided and interconnected to various other components by system bus 101. An operating system 128 runs on CPU 102 and provides coordination and control among the various components of data processing system 100. A program application 130 operates in conjunction with operating system 128, and provides output calls to operating system 128 which implement the various functions to be performed by application 130.

A read only memory (ROM) 104 is connected to CPU 102 via bus 101 and includes the basic input/output (BIOS) that controls basic computer functions. A random access memory (RAM) 106, I/O adapter 108 and communications adapter 122 are also interconnected to system bus 101. It should be noted that software components, such as operating system 128 and application 130, are loaded into RAM 106, which operates as the main memory for data processing system 100. I/O adapter 108 may be a small computer system interface (SCSI) adapter that communicates with a disk storage device 110. Communications adapter 122 interconnects bus 101 with an external network, enabling data processing system 100 to communicate with other such systems over a local area network (LAN) or wide area network (WAN), such as the Internet. By utilizing the aforementioned I/O devices, a user is capable of inputting information to data processing system 100 through input devices such as a keyboard 114, a mouse 116, and receiving output information from the system from a speaker 118 or a visual display screen 126.

As further illustrated in FIG. 1, a main memory 170 is connected to system bus 101, and includes a control program 171. Control program 171 resides within main memory 170 and contains instructions that when executed on CPU 102 carry out the operations depicted in the high-level flow diagrams of FIGS. 3 and 4 described herein. The computer program product also can be referred to as a program product. Control program 171 can support a number of interactive graphics tools including, for example, graphical user interfaces (GUIs), and rendering packages. Among known rendering software applications are Radiance®, Adeline®, 3D Studio®, and the like.

It is important to note that, while the present invention has been (and will continue to be) described in the context of a fully functional computer system, those skilled in the art can appreciate that the present invention is capable of being distributed as a program product in a variety of forms and that the present invention applies equally regardless of the particular type of signal-bearing media utilized to actually carry out the distribution. Examples of signal-bearing media include: recordable-type media, such as floppy disks, hard-disk drives and CD ROMs, and transmission-type media, such as digital and analog communication links.

Communications adapter 122 may be provided by a network card (not depicted) which can be connected to system bus 101 in order to link data processing system 100 to other data-processing system networks in a client/server architecture or to groups of computers and associated devices which are connected by communications facilities. Those skilled in the art will appreciate that the hardware depicted in FIG. 1 may vary for specific applications. For example, other peripheral devices, such as: optical-disk media, audio adapters, or chip-programming devices, such as PAL or EPROM programming devices and the like also may be utilized in addition to or in place of the hardware already depicted. Note that any or all of the above components and associated hardware may be utilized in various embodiments. However, it can be appreciated that any configuration of the aforementioned system may be used for various purposes according to a particular implementation.

Figure 2:
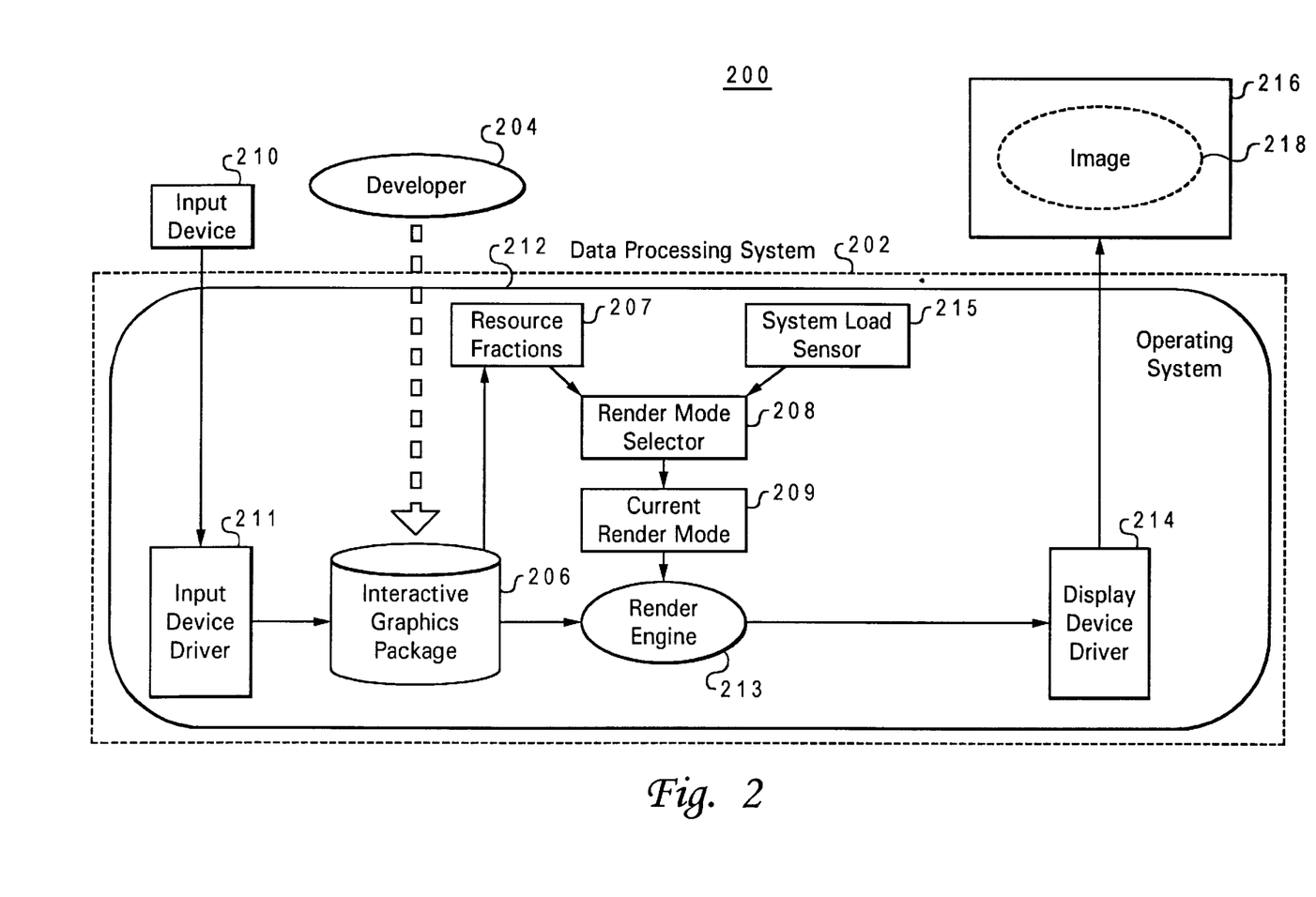
FIG. 2 is a high-level block diagram depicting an interactive graphics application operating in a data processing system in accordance with one embodiment of the method and system of the present invention.

FIG. 2 is a high-level block diagram depicting the operation of an interactive graphics application 200 in a data processing system in accordance with one embodiment of the method and system of the present invention. As illustrated in FIG. 2, interactive graphics application 200 is implemented within the context of a data processing system 202 into which an interactive graphics package 206 has been installed. Prior to installation of interactive graphics package 206 into data processing system 202, interactive graphics package 206 is assembled by an external developer 204 who has included a rendering engine 213 that is capable of rendering images using one of N possible rendering modes. Rendering engine 213 renders images 218 within display device 216.

From a user perspective, each of the rendering modes produces images having varying visual quality characteristics such as lighting, and surface attributes such as color, reflective properties, and texture. These, and other similar quality characteristics are assessed to categorize a particular rendering mode as having a particular ranking among the rendering modes available within interactive graphics package 206. It should be noted that the inventive concept disclosed herein is independent of any of the many possible visual quality rankings that may be imposed in accordance with any or all of the above-mentioned visual quality characteristics.

In describing the method and system of the present invention, these visual quality characteristics are relevant with respect to two fundamental rendering mode metrics— image quality and rendering speed. The rendering mode speed refers to the time it takes for an image to be processed (using the specified rendering mode) within data processing system 202 and presented by display device 216. It may be assumed that a higher image quality will require greater processing resources and that its presentation within data processing system 202 will therefore be "slower" than the presentation of an image of lesser visual quality.

Interactive graphics package 206 operates in the context of an operating system 212 within data processing system 202. In conjunction with controlling the allocation and usage of hardware resources within data processing system 202, operating system 212 provides the environment within which rendering modes provided by interactive graphics package 206 may be selected such that the amount of computation required to render using the selected mode is compatible with the processing load on data processing system 202.

Consistent with the spirit and scope of the present invention, the rendering speed metric of each of the rendering modes within interactive graphics package 206 may be determined utilizing any of a variety of methods. The particular method chosen is transparent with respect to the illustration of FIG. 2. In one embodiment of the present invention, each of the rendering modes has been categorized according to the respective amount of processing resources that it consumes. Developer 204 has pre-assessed this resource consumption metric for each of the rendering modes within interactive graphics package 206 and has provided these values as part of the overall package. A processor such as CPU 102 of FIG. 1 is included with data processing system 202. Given the wide range in processing capacities among different CPUs and data processing systems, the processing capacity is compared with the resource consumption metric of each rendering mode. The resource usage of a rendering mode in terms of the total processing capacity available for rendering within a particular data processing system, such as data processing system 202, will be referred to hereinafter as the "resource fraction". In the absence of such a pre-determined metric, the resource fraction of each of the modes may be empirically determined by using a program analysis utility (not depicted) within operating system 212 that directly measures and records the fraction of system processing capacity required to render an images using each of the available rendering modes.

Once the resource fraction for each rendering mode has been determined, the adaptive rendering technique of the present invention may be practiced while interactive graphics package 206 is active. Upon activation of interactive graphics package 206, an input device 210 imposes a processing load on data processing system 202. Input device 210 may be a keyboard, mouse, joystick or any other interface by which a user communicates with data processing system 202. In response to user input, graphics package 206 uses a rendering method to generate an image 218, which it displays on display device 216 through commands to display device driver 214 that executes in the context of operating system 212.

In an important feature of the present invention, a system load sensor 215 determines a real-time processing load imposed on data processing system 202 by input device 210 and also from programs that may be executing on the data processing system 202. In one embodiment of the present invention, processor load sensor 215, which may be a hardware, firmware or software entity, monitors the signal density from input device 210. Tracking the number of interrupts per unit time is one possible method by which program analysis utility may gauge user activity and thus provide an approximate, real-time estimation of processing load. In the alternative, a load monitoring software application may be included within interactive graphics package 206 thus mobilizing this load monitoring technique and making it platform independent. In this manner, processing load may be determined by periodically querying operating system 212 and retrieving the resulting processing load information into the load monitoring application within interactive graphics package 206.

As illustrated in FIG. 2, interactive graphics application 200 further includes a render mode select facility 208 for directing the dynamic selection of an appropriate rendering mode. The resource fractions for each of the rendering modes are accessible by render mode select facility 208 which may reside within interactive graphics package 206. The system load sensor 215 relates system load information to render mode select facility 208. In turn, the render mode select facility 208 compares the resource fraction of each rendering mode with the currently available processing capacity as determined by the processing load. A rendering mode may then be selected and activated by render mode select facility 208 such that the amount of computation required to render using the selected rendering mode is compatible with the determined processor load. Until changed by the render mode select facility 208, render engine 213 uses the selected render mode for subsequent image rendering.

Figure 3:
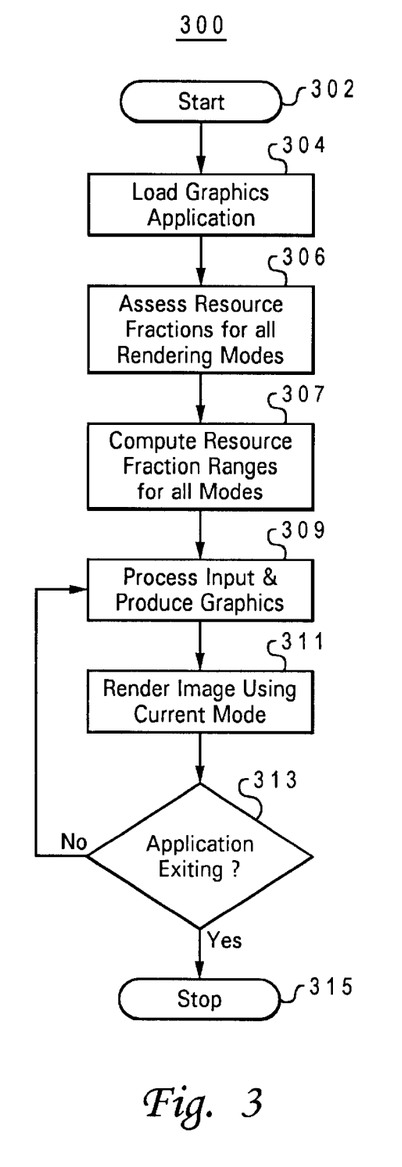
FIG. 3 is a high-level flow diagram illustrating method steps utilized in one embodiment of the method and system of the present invention.

With reference now to FIG. 3, a high-level flow diagram illustrates a sequence 300 of method steps utilized in one embodiment of the method and system of the present invention. Sequence 300 commences as depicted at step 302 and proceeds to step 304, which illustrates installation of an interactive graphics application, such as interactive graphics application 206, into a data processing system. During or immediately following the installation or loading of the interactive graphics application, the resource fraction for each available rendering mode is assessed as shown at step 306.

Once the resource fraction of each rendering mode has been calculated, step 307 illustrates the computation of resource fraction ranges for each rendering mode. The resource fraction range of a rendering mode indicates the range of available processing capacities in a data processing system for which the corresponding rendering mode should be used. In one embodiment of the invention, the resource fraction ranges are calculated by first sorting the rendering modes in accordance with their resource fractions. Let the resource fractions of the sorted rendering modes 1 through N be $R_1$ through $R_N$. Then, the resource fraction range for rendering mode i where 1<i<N is computed as the range $(R_i+R_{i-1})/2$ to $(R_i+R_{i+1})/2$. The lower limit for render mode 1 is 0, while the upper limit for render mode N is 1. The upper and lower limits for these two modes are calculated using the given formula.

Step 309 depicts the first step in the cyclic operation of the interactive graphics application. In this step, the graphics program processes inputs it may have received and produces graphics images. As illustrated at step 311, while the graphics application renders the image using the currently set rendering mode, a rendering mode selection is performed as described in further detail with reference to FIG. 4. Step 313 is the third step in the cyclic loop. In this step, the graphics applications checks to see if it needs to exit (for instance, in response to a user termination request). If not, the application loops back to step 309. If the determination is that the application must terminate, it does so in step 315. The process embodied by steps 309, 311, and 313 may be performed in periodic time increments.

An assumption upon which the utility of step 311 relies is that the quality of a rendered image is compatible with the speed at which the image is rendered. The rendering modes used by the rendering engine 213 have various rendering speeds ranging from slow ones that produce superb image quality such as raytracing schemes, to fast ones that provide reduced image quality:such as simple wireframes.

Figure 4:
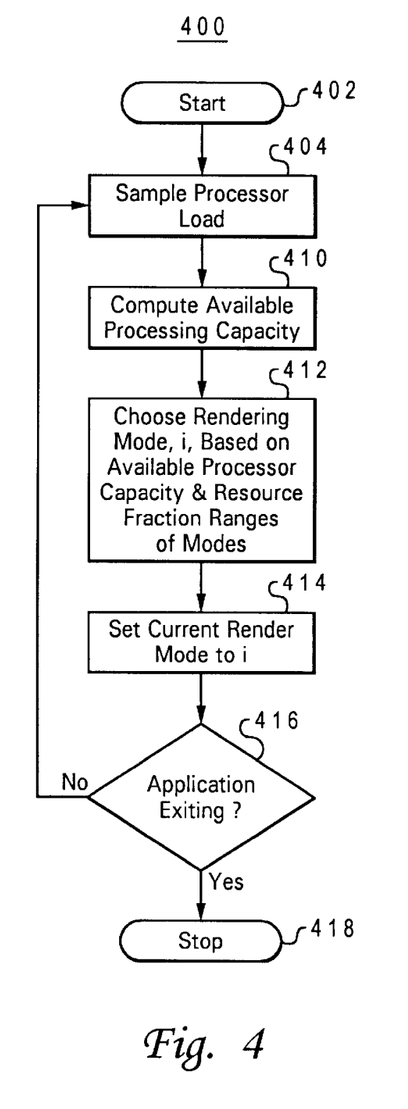
FIG. 4 is a high-level logic diagram depicting the details of the method used to dynamically set the rendering mode in accordance with the teachings of the present invention.

FIG. 4 is a high-level logic diagram depicting a dynamic rendering mode selection sequence 400 in accordance with the teachings of the present invention. Rendering mode selection sequence 400 commences as shown at step 402 and proceeds to step 404, which illustrates the system processing load being sampled. This may be done through a system load sensor facility 205 incorporated in the data processing system. Once the processing load has been determined, and as shown at step 410, the processing capacity available for rendering images is determined. In one embodiment of the present invention, this available capacity may be computed as the difference between the maximum possible processing capacity (i.e., 1.0) and the current processing load as a fraction of the maximum.

After determining the available processing capacity, step 412 depicts the selection of a rendering mode based on the resource fraction ranges of the rendering modes. The rendering mode whose resource fraction range encompasses the available processing capacity is chosen. As illustrated at step 414, this rendering mode is installed as the current mode for rendering images produced by the graphics application. Step 416 depicts a determination of whether the graphics application is terminating. If not, control loops back to step 404. If the determination is that the application must terminate, it does so as shown at step 418. The process embodied by steps 404 through 416 may be performed in periodic time increments.

Figure 5:
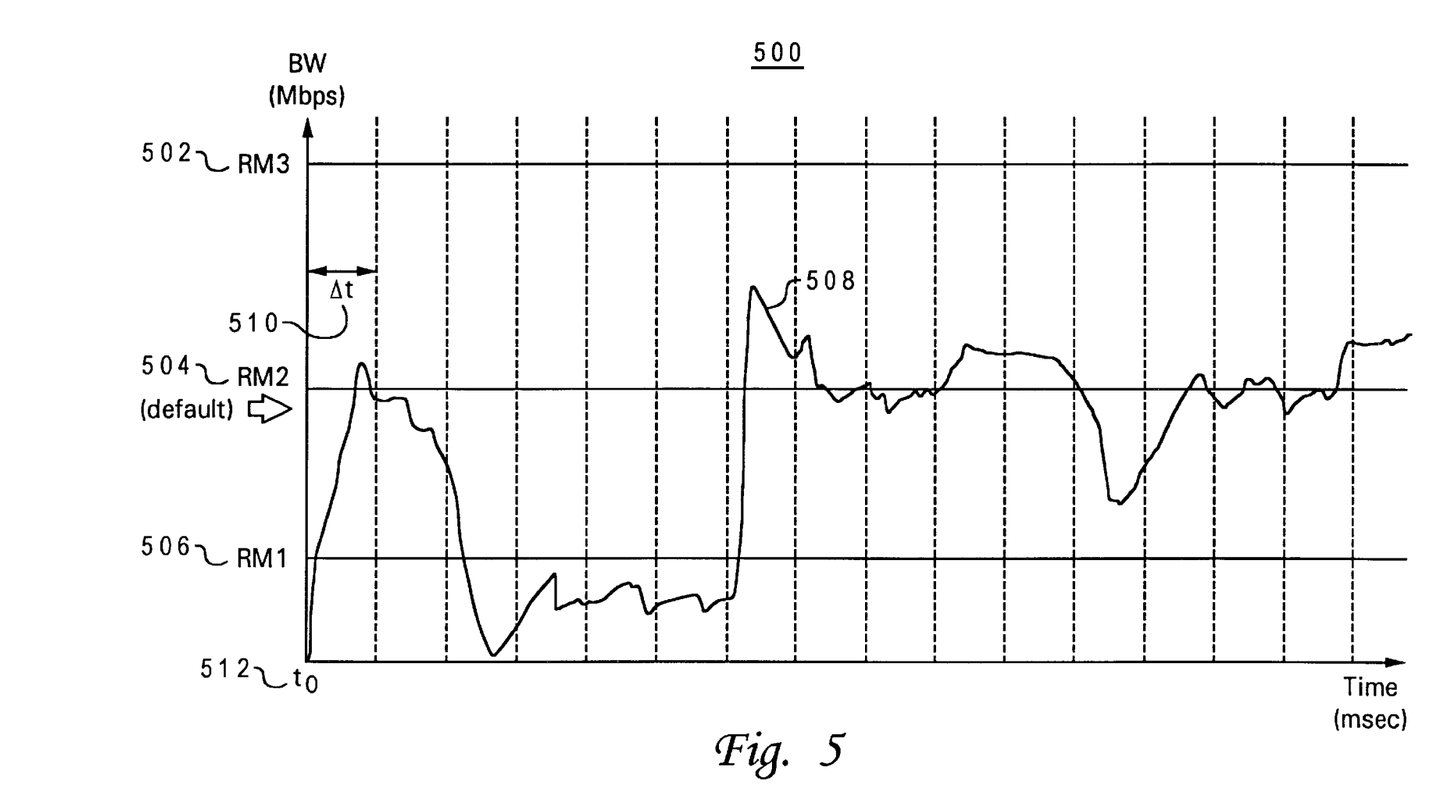
FIG. 5 is a graphical representation of real-time rendering mode adjustment in accordance with one embodiment of the present invention.

Turning now to FIG. 5, there is illustrated a graphical representation of real-time rendering mode adjustment in accordance with one embodiment of the present invention. Three image rendering modes, RM1 506, RM2 504, and RM3 502 are shown to have distinct resource requirements. RM2 504 has a relatively moderate resource requirement and is therefore selected as the default mode utilized when the graphics application commences at time $t_0$ 512. Sampling interval $\Delta t$ 510 is the periodic time interval selected to perform the rendering mode adjustment steps illustrated in FIGS. 3 and 4. In one embodiment of the present invention, the sampling interval is selected to provide optimal benefits of the rendering mode adjustment technique of the present invention, while not imposing an unacceptable processing overhead which will itself interfere with the goal of enhanced image rendering. Curve 508 represents the level of currently utilized processing capacity as determined by step 310 of FIG. 3 and steps 408 and 410 of FIG. 4. As illustrated in FIG. 5, only one rendering mode is active at any given time in accordance with the available processing load.

Although the foregoing description and figures have frequently alluded to "interactive graphics applications" (such as video games) as the platform in which the method and system of the present invention may be practiced, it should be noted that the present invention is applicable to any dynamic visual presentation such as step-wise simulation-based design, virtual reality packages, broadcast video, Computer Aided Drawing (CAD), or any other computer application which utilizes any sensory feedback to interact with a user.

Preferred implementations of the invention include implementations as a computer system programmed to execute the method or methods described herein, and as a program product. According to the computer system implementation, sets of instructions for executing the method and methods are resident in RAM of one or more computer systems configured generally as described above. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps described within reference to FIGS. 3 and 4 can be accomplished with a computer-aided device. In such a method, data stored in a memory unit of a data-processing system such as a data-processing system, can represent steps in a method for implementing a preferred embodiment of the present invention.

While the invention has been particularly shown as described with reference to a preferred embodiment, it will be understood by those skilled in the art that various changes in form and detail may be made therein without departing from the spirit and scope of the invention.

What is claimed is:

1. A method within a data processing system for enhancing image quality while operating an interactive graphics application having a plurality of image rendering modes, said method comprising the steps of:

assessing said plurality of image rendering modes by resource fraction;

during operation of said interactive graphics application within said data processing system, determining a processing load on said data processing system; and selecting one of said plurality of image rendering modes in accordance with the assessed resource fraction and the determined processing load.

2. The method of claim 1, wherein said data processing system includes at least one processor having a total processing capacity, and wherein said assessing step comprises the steps of:

determining a resource fraction of said total processing capacity required for each of said plurality of rendering modes; and assigning a resource fraction range to each of said plurality of rendering modes such that each range encompasses the resource fraction for the corresponding rendering mode.

3. The method of claim 2, wherein said assigning step comprises determining an upper limit, UL, and a lower limit, LL, for each of said ranges in accordance with the relations:

$$UL=(R_i+R_{i+1})/2;$$

and $$LL=(R_i+R_{i-1})/2;$$

wherein $R_i$ designates the resource fraction for the $i^{th}$ image rendering mode among said plurality of image rendering modes, and wherein $R_0$ and $R_{N+1}$ are two fictitious resource fractions created with values 0 and $(2-R_N)$ respectively.

4. The method of claim 2, wherein said assessing step comprises empirically determining a resource fraction range for each of said plurality of rendering modes.

5. The method of claim 4, wherein said empirically determining step comprises measuring a fraction of said total processing capacity required to render an image for each of said plurality of rendering modes within said data processing system.

6. The method of claim 1, wherein said data processing system further comprises a user input device utilized to interactively impose said processing load on said data processing system during operation of said interactive graphics application, and wherein said step of determining a processing load comprises monitoring a signal density from said user input device.

7. The method of claim 6, wherein said data processing system further comprises an operating system for implementing said interactive graphics application, and wherein said monitoring step comprises tracking a number of interrupts per unit time as counted by said operating system.

8. The method of claim 7, wherein said interactive graphics application comprises a load monitoring application, and wherein said step of determining a processing load comprises the steps of:
   querying said operating system from said load monitoring application; and
   retrieving processing load information from said operating system into said load monitoring application in response to said querying step.

9. The method of claim 1, further comprising the step of assembling said interactive graphics application to include said plurality of image rendering modes, wherein each image rendering mode among said plurality of image rendering modes utilizes a corresponding rendering engine for rendering an image.

10. The method of claim 9, further comprising the steps of:
   categorizing the rendering engine corresponding to each of said image rendering modes as providing distinct surface attribute qualities for the rendered image, such that each of said image rendering modes has a unique image quality characterization; and
   activating one of said at least one selected image rendering modes in accordance with said unique image quality characterization, such that said data processing system may provide an image rendering quality that is optimized in accordance with said processing load.

11. The method of claim 9, wherein said assembling step comprises the step of selecting said plurality of rendering modes from a group including raytracing and wireframe.

12. The method of claim 1, wherein said assessing step is performed within said interactive graphics application, and wherein said method further comprises the step of estimating a fraction of processing resources required to render an image within said interactive graphics application.

13. The method of claim 1, wherein said data processing system has a total processing capacity and an available processing capacity which is the difference between said total processing capacity and the determined processing load, and wherein said selecting step further comprises the steps of:
   comparing the assessed resource fraction range for each of said plurality of rendering modes with the available processing capacity; and
   selecting a rendering mode from said plurality of rendering modes that has a resource fraction range encompassing the available processing capacity.

14. A program product comprising computer readable storage media including program logic that causes control circuitry to execute program instructions for optimizing image quality while operating an interactive graphics application having a plurality of image rendering modes, said program product comprising:
   instruction means for assessing said plurality of image rendering modes by resource fraction;
   instruction means for determining a processing load on said data processing system; and
   instruction means for selecting one of said plurality of image rendering modes in accordance with the assessed resource fraction and the determined processing load.

15. The program product of claim 14, wherein said data processing system includes at least one processor having a total processing capacity, and wherein said assessing step comprises:
   instruction means for determining a resource fraction of said total processing capacity required for each of said plurality of rendering modes; and
   instruction means for assigning a resource fraction range to each of said plurality of rendering modes such that each range encompasses the resource fraction for the corresponding rendering mode.

16. The program product of claim 15, wherein said instruction means for assigning comprises instruction means for determining an upper limit, UL, and a lower limit, LL, for each of said ranges in accordance with the relations:

$UL(R_i+R_{i+1})/2;$ and $LL(R_i+R_{i-1})/2;$ wherein $R_i$ designates the resource fraction for the $i^{th}$ image rendering mode among said plurality of image rendering modes, and wherein $R_0$ and $R_{N+1}$ are two fictitious resource fractions created with values 0 and $(2-R_N)$ respectively.

17. The program product of claim 15, wherein said instruction means for assessing comprises instruction means for empirically determining a resource fraction range for each of said plurality of rendering modes.

18. The program product of claim 17, wherein said instruction means for empirically determining comprises instruction means for measuring a fraction of said total processing capacity required to render an image for each of said plurality of rendering modes within said data processing system.

19. The program product of claim 14, wherein said data processing system further comprises a user input device utilized to interactively impose said processing load on said data processing system during operation of said interactive graphics application, and wherein said instruction means for determining a processing load comprises instruction means for monitoring a signal density from said user input device.

20. The program product of claim 19, wherein said data processing system further comprises an operating system for implementing said interactive graphics application, and wherein said instruction means for monitoring comprises instruction means for tracking a number of interrupts per unit time as counted by said operating system.

21. The program product of claim 20, wherein said interactive graphics application comprises a load monitoring application, and wherein said instruction means for determining a processing load comprises:
   instruction means for querying said operating system from said load monitoring application; and
   instruction means for retrieving processing load information from said operating system into said load monitoring application.

22. The program product of claim 14, further comprising instruction means for assembling said interactive graphics application to includes said plurality of image rendering modes, wherein each image rendering mode among said plurality of image rendering modes utilizes a corresponding rendering engine for rendering an image.

23. The program product of claim 22, further comprising:
   instruction means for categorizing the rendering engine corresponding to each of said image rendering modes as providing distinct surface attribute qualities for the rendered image, such that each of said image rendering modes has a unique image quality characterization; and
   instruction means for activating one of said at least one selected image rendering modes in accordance with said unique image quality characterization, such that said data processing system may provide an image rendering quality that is optimized in accordance with said processing load.

24. The program product of claim 22, wherein said instruction means for assembling comprises instruction means for selecting said plurality of rendering modes from a group including raytracing and wireframe.

25. The program product of claim 14, wherein said instruction means for assessing is included within said interactive graphics application, and wherein said program product further comprises instruction means for estimating a fraction of processing resources required to render an image within said interactive graphics application.

26. The program product of claim 14, wherein said data processing system has a total processing capacity and an available processing capacity which is the difference between said total processing capacity and the determined processing load, and wherein said instruction means for selecting further comprises:

instruction means for comparing the assessed resource fraction range for each of said plurality of rendering modes with the available processing capacity; and instruction means for selecting one of said plurality of image rendering modes in accordance with the assessed resource fraction range that encompasses the available processing capacity.

* * * * *